US008058216B2

(12) United States Patent
Kawamura

(10) Patent No.: US 8,058,216 B2
(45) Date of Patent: Nov. 15, 2011

(54) GREASE COMPOSITION AND GREASE-ENCLOSED ROLLING BEARING

(75) Inventor: Takayuki Kawamura, Kuwana (JP)

(73) Assignee: NTN Corporation, Osaka (JP)

( * ) Notice: Subject to any disclaimer, the term of this patent is extended or adjusted under 35 U.S.C. 154(b) by 62 days.

(21) Appl. No.: 11/792,102

(22) PCT Filed: Dec. 15, 2005

(86) PCT No.: PCT/JP2005/023035
§ 371 (c)(1),
(2), (4) Date: May 31, 2007

(87) PCT Pub. No.: WO2006/064869
PCT Pub. Date: Jun. 22, 2006

(65) Prior Publication Data
US 2008/0166080 A1 Jul. 10, 2008

(30) Foreign Application Priority Data

Dec. 17, 2004 (JP) .................................. 2004-366631
Feb. 17, 2005 (JP) .................................. 2005-041047

(51) Int. Cl.
| C10M 137/10 | (2006.01) |
| C10M 169/04 | (2006.01) |
| C10M 105/34 | (2006.01) |
| C10M 141/10 | (2006.01) |
| C10M 173/02 | (2006.01) |
| F16C 19/00 | (2006.01) |

(52) U.S. Cl. ........ 508/371; 508/110; 508/463; 508/378; 508/474; 508/552; 384/462

(58) Field of Classification Search .................. 508/371, 508/110, 463, 378, 474, 552; 384/462
See application file for complete search history.

(56) References Cited

U.S. PATENT DOCUMENTS 4,661,276 A 4/1987 Stemke
(Continued)

FOREIGN PATENT DOCUMENTS

DE 197 47 113 A1 4/1998
(Continued)

OTHER PUBLICATIONS

International Search Report, Mar. 7, 2006.
(Continued)

*Primary Examiner* — Glenn Caldarola
*Assistant Examiner* — Vishal Vasisth
(74) *Attorney, Agent, or Firm* — Hedman & Costigan, P.C.; James V. Costigan

(57) ABSTRACT

The present invention provides a grease composition capable of securely preventing an abnormal noise from being generated when it is cold and having a long life at a high temperature, and a rolling bearing in which this grease is enclosed. The grease composition having heat-resistant properties and performance of preventing the generation of a low-temperature abnormal noise contains a base oil, a thickener, and an additive, and is used for a rolling bearing. A worked penetration of the grease composition at 25° C. is 300 or less, and an unworked penetration thereof at −20° C. is 200 or more. The grease-enclosed rolling bearing has an inner ring, an outer ring, rolling elements interposed between the inner ring and the outer ring, and the above-described grease composition enclosed on a periphery of the rolling elements. The grease-enclosed rolling bearing is used for an automotive electric auxiliary machine.

5 Claims, 6 Drawing Sheets

U.S. PATENT DOCUMENTS

| | | | |
|---|---|---|---|
| 4,859,352 A * | 8/1989 | Waynick | 508/174 |
| 5,840,666 A * | 11/1998 | Yokouchi et al. | 508/291 |
| 5,858,934 A * | 1/1999 | Wiggins et al. | 508/486 |
| 5,910,470 A | 6/1999 | Minami et al. | |
| 5,915,844 A | 6/1999 | Nanbu et al. | |
| 6,329,327 B1 * | 12/2001 | Tanaka et al. | 508/362 |
| 6,396,018 B1 | 5/2002 | Kinoshita et al. | |
| 6,682,223 B2 * | 1/2004 | Sugimori et al. | 384/462 |
| 2002/0137639 A1 | 9/2002 | Asao et al. | |
| 2004/0242439 A1* | 12/2004 | Mikami et al. | 508/480 |
| 2005/0009713 A1* | 1/2005 | Kohara et al. | 508/165 |
| 2005/0250653 A1 | 11/2005 | Iso et al. | |

FOREIGN PATENT DOCUMENTS

| | | |
|---|---|---|
| EP | 1510569 A1 | 3/2005 |
| JP | 03-179094 | 8/1991 |
| JP | 04-153297 | 5/1992 |
| JP | 11-228983 | 8/1993 |
| JP | 08-176578 | 7/1996 |
| JP | 10-130682 | 5/1998 |
| JP | 11-270566 | 10/1999 |
| JP | 2000-248290 | 9/2000 |
| JP | 2001-107073 | 4/2001 |
| JP | 2002-105474 | 4/2002 |
| JP | 2002-363588 | 12/2002 |
| JP | 2003-106338 | 4/2003 |
| JP | 2003-342593 A | 12/2003 |
| JP | 2004-169790 | 6/2004 |
| JP | 2006-77119 | 3/2006 |

OTHER PUBLICATIONS

EP Search Report, Dated Mar. 16, 2009.

* cited by examiner

_US 8,058,216 B2_

GREASE COMPOSITION AND GREASE-ENCLOSED ROLLING BEARING

This application is a 371 of PCT/JP05/23035, filed Dec. 15, 2005.

TECHNICAL FIELD

The present invention relates to a grease composition enclosed in a rolling bearing incorporated in various industrial machines, vehicles, and the like, and more particularly, to a grease composition having heat-resistant properties and performance of preventing an abnormal noise from being generated when it is cold, which is preferable for a bearing operated at a high rotational speed in a wide temperature range from a low temperature at which an abnormal noise is generated to a high temperature.

BACKGROUND ART

A grease composition is enclosed in a rolling bearing incorporated in various industrial machines, vehicles, and the like to impart lubricating properties to the rolling bearing. The grease composition is obtained by compounding a thickener with a base oil. As the base oil, mineral oil and synthetic lubricating oil such as ester oil, silicone oil, ether oil, fluorine oil, and the like are generally used. As the thickener, metal soap such as lithium soap, urea compounds, and fluororesin are generally used. In recent years, a rolling bearing tends to be used at a high temperature and a high rotational speed. Thus the grease composition is demanded to have durability at a high temperature. When the metal soap is used as the thickener, oxidation of the base oil is accelerated at the high temperature and thus lubricating effect deteriorates. Regarding the base oil, the grease composition containing the mineral oil as the base oil thereof is oxidized more readily than the grease composition containing the synthetic lubricating oil as the base oil thereof and thus tends to have a short lubricating life at the high temperature. Thus in recent years, the grease composition containing the synthetic lubricating oil as the base oil thereof and the urea compound or the fluororesin as the thickener thereof is mainly used for the rolling bearing which is used especially at a high temperature and at a high rotational speed.

As various industrial mechanical members become compact and have high performance, use conditions of the rolling bearing tend to be stricter. Consequently the grease composition is demanded to have a higher lubricating properties and a longer lubricating life.

In compliance with the demand for the longer lubricating life at a high temperature, the addition of an antioxidant and a rust preventive agent to the grease composition containing a synthetic lubricating oil having a high viscosity as its base oil and an urea compound as its thickener is examined. But when the grease composition contains the additives, the viscosity of the grease composition rises under cold condition, thereby the grease composition is liable to cause an abnormal noise.

When an equipment to be driven by an automotive engine such as a pulley is operated under cold condition, there is a case in which an abnormal sound (sound similar to that generated by playing flute), so-called a low-temperature abnormal noise, is generated. Although the reason why the low-temperature abnormal noise is generated has not been clarified, it is supposed that the abnormal noise is generated owing to a self-excited vibration of a rolling element caused by nonuniformity of an oil film of grease. Specifically, under cold condition, the oil film on the raceway surface is liable to be nonuniform owing to a rise of the viscosity of the base oil of the grease. The nonuniformity of the oil film causes the coefficient of friction between the rolling element and the raceway surface to make a slight periodical change. Thereby the rolling element generates the self-excited vibration. Owing to the self-excited vibration, the pulley system resonates with the rolling element. As a result, the outer ring vibrates axially (translational motion) to generate the low-temperature abnormal noise.

As the grease excellent in the durability at the high temperature and preventing the generation of the low-temperature abnormal noise, grease containing a base oil composed of a mixed oil of synthetic hydrocarbon oil and ester synthetic oil having eight or more ester groups arranged in a comb-like fashion on one side of eight or more carbon atoms constituting chain molecules of oil, an urea compound mixed with the base oil as a thickener, and dithiophosphate added to the base oil as an extreme-pressure agent is known (see patent document 1).

A bearing for use in an automotive pulley which includes a grease composition containing a base oil composed of a mixed oil of poly-α-olefin (hereinafter abbreviated as PAO) oil and an ester oil, an alicyclic diurea compound mixed with the base oil as a thickener, and zinc dithiocarbamate as an additive added to the base oil is known. In the bearing, a contact angle is formed by bringing each of a plurality of balls interposed between an inner ring and an outer ring both constituting the bearing into contact with the inner ring or with at least the outer ring at two points (see patent document 2).

Patent document 1: Japanese Patent Application Laid-Open No. 9-208982
Patent document 2: Japanese Patent Application Laid-Open No. 11-270566

These attempts are aimed at the stability of the oil film under cold condition to prevent the generation of the low-temperature abnormal noise, and at a long life of the grease composition at the high temperature. But only the mixture of the synthetic hydrocarbon oil and the ester oil is incapable of obtaining an effect of sufficiently preventing the generation of the low-temperature abnormal noise.

DISCLOSURE OF THE INVENTION

Problems to be Solved by the Invention

It is an object of the present invention to provide a grease composition capable of securely preventing an abnormal noise from being generated when it is cold and having a long life at a high temperature, and a rolling bearing in which this grease is enclosed.

Means for Solving the Problems

In the present invention, a grease composition having heat-resistant properties and performance of preventing an abnormal noise from being generated when it is cold contains a base oil, a thickener, and an additive, and is used for a rolling bearing. A worked penetration of the grease composition at 25° C. is 300 or less, and an unworked penetration thereof at −20° C. is 200 or more.

The base oil for use in the above-described grease composition contains at least one oil selected from among ether oil, ester oil, and synthetic hydrocarbon oil. A kinematic viscosity of the base oil at 40° C. is 15 mm$^2$/s to 200 mm$^2$/s. The base oil contains the synthetic hydrocarbon oil as an essential component thereof.

The additive for use in the above-described grease composition contains poly(metha)acrylate. A mixing amount of the poly(metha)acrylate for a total of an amount of the base oil and an amount of the thickener is 3 to 10 wt %.

The thickener for use in the above-described grease composition contains an urea compound shown by the following chemical formula 2:

[Chemical formula 2]

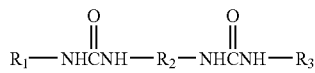

In the chemical formula 2, $R_1$ and $R_3$ represent any one of an aromatic hydrocarbon group having 6 to 12 carbon atoms, an alicyclic hydrocarbon group having 6 to 20 carbon atoms, and an aliphatic hydrocarbon group having 6 to 20 carbon atoms. $R_1$ and $R_3$ may be identical to or different from each other. $R_2$ represents an aromatic hydrocarbon group having 6 to 12 carbon atoms.

The consistency is measured by carrying out the method specified in JIS K2220.

A grease-enclosed rolling bearing of the present invention includes an inner ring, an outer ring, rolling elements interposed between the inner ring and the outer ring, and the above-described grease composition having heat-resistant properties and performance of preventing an abnormal noise from being generated when it is cold enclosed on a periphery of the rolling elements.

The grease-enclosed rolling bearing is used for an automotive electric auxiliary machine in which a rotating shaft to be rotatably driven by an output of an engine is rotatably supported on a stationary member. The grease-enclosed rolling bearing is heat-resistant and has performance of preventing the abnormal noise from being generated when it is cold. The above-described automotive electric auxiliary machine is a fan coupling apparatus, an alternator, an idler pulley, a tension pulley, an electromagnetic clutch or a compressor.

Effect of the Invention

The grease composition of the present invention is heat-resistant and has performance of preventing an abnormal noise from being generated when it is cold. The grease composition contains a base oil, a thickener, and an additive. The grease composition has a worked penetration at 25° C. of 300 or less, and an unworked penetration at −20° C. of 200 or more. The above-described base oil contains at least one oil selected from among ether oil, ester oil, and synthetic hydrocarbon oil. The kinematic viscosity of the base oil at 40° C. is 15 mm$^2$/s to 200 mm$^2$/s. The above-described additive contains the poly(metha)acrylate. Owing to these aspects, it is possible to prevent a decrease of the viscosity at a low temperature. Consequently the grease composition displays preferable lubricating properties in a wide temperature range from a low temperature to a high temperature, thus continuously preventing the generation of the low-temperature abnormal noise from a time immediately after the rolling bearing starts to operate at a low temperature and is capable of maintaining the properties excellent in durability at a high temperature for a long time. Therefore the grease composition is heat-resistant and has performance of preventing the abnormal noise from being generated when it is cold. Hence the grease composition can be enclosed in the bearing and is capable of greatly prolonging the life of the bearing.

The grease-enclosed bearing of the present invention has an inner ring, an outer ring, rolling elements interposed between the inner ring and the outer ring, and the above-described grease composition enclosed on the periphery of the rolling elements. Therefore the rolling bearing is preferably lubricated in a wide temperature range from a low temperature to a high temperature, thus can prevent the generation of the low-temperature abnormal noise from the time immediately after the rolling bearing starts to operate at a low temperature. In addition, the rolling bearing is capable of maintaining the properties excellent in durability at a high temperature for a long time, thus the life of the rolling bearing can be prolonged greatly.

The above-described grease-enclosed rolling bearing is used for the automotive electric auxiliary machine, and it is possible to keep the lubricating properties at a high temperature and securely prevent the generation of the abnormal noise under cold condition.

BEST MODE FOR CARRYING OUT THE INVENTION

To provide a grease composition which can securely prevent an abnormal noise from being generated when it is cold and also can achieve a long life at a high temperature and a grease-enclosed rolling bearing, the present inventors have made keen examinations. As a result, they have found that a rolling bearing in which a grease composition described below is enclosed can achieve both goals of preventing the abnormal noise from being generated when it is cold and of a long life at a high temperature: The grease composition contains a base oil and a thickener, and has a worked penetration at 25° C. of 300 or less and an unworked penetration at −20° C. of 200 or more. The base oil composing the grease composition contains at least one oil selected from among ether oil, ester oil, and synthetic hydrocarbon oil; a kinematic viscosity of the base oil at 40° C. is 15 mm$^2$/s to 200 mm$^2$/s; and poly(metha) acrylate is contained as an additive. It is considered that by adjusting the unworked penetration of the grease composition at −20° C. in addition to adjustment of the worked penetration thereof at 25° C., whereby a long life can be achieved at a high temperature, it is possible to prevent a rise of the viscosity of the grease composition under cold condition and that by suppressing the generation of nonuniformity of an oil film on a raceway surface of the bearing, it is possible to increase the effect of preventing the generation of the low-temperature abnormal noise. The present invention has been made based on the above-described finding.

Regarding the consistency of the grease composition of the present invention having heat-resistant properties and performance of preventing the abnormal noise from being generated when it is cold, the worked penetration at 25° C. is 300 or less, and the unworked penetration at −20° C. is 200 or more. If the worked penetration of the grease composition at 25° C. exceeds 300, the grease is liable to leak at a high-temperature and high-speed operation, which shortens the lubricating life of the grease. If the unworked penetration of the grease composition at −20° C. is below 200, the low-temperature abnormal noise is liable to be generated.

The grease composition of the present invention is obtained by using a base oil having a high viscosity index such as PAO oil, GTL oil synthesized by Fischer-Tropsch Method and by adding an additive such as a viscosity index improver such as the poly(metha)acrylate for improving the viscosity index of the base oil to the base oil.

As examples of the poly(metha)acrylate that can be used in the present invention, it is possible to list polymers or copolymers of methyl(metha)acrylate, ethyl(metha)acrylate, propyl (metha)acrylate, butyl(metha)acrylate, pentyl(metha)acrylate, hexyl(metha)acrylate, heptyl(metha)acrylate, octyl (metha)acrylate, nonyl(metha)acrylate, decyl(metha)acrylate, dodecyl(metha)acrylate, tetradecyl(metha)acrylate, hexadecyl(metha)acrylate, octadecyl(metha)acrylate, icosyl (metha)acrylate, docosyl(metha)acrylate, tetracosyl(metha)acrylate, octacosyl(metha)acrylate, and triacontyl(metha)acrylate. These compounds may be used singly or in combination of two kinds or more of them. Of these compounds, the poly(metha)acrylate having a weight-average molecular weight of 20000 to 1.5 millions is preferable.

The base oil which can be used in the present invention is mineral oil, synthetic oil, and mixed oil thereof, which are commonly used in grease.

Specifically, as the mineral oil, it is possible to list paraffin mineral oil and naphthene mineral oil. As the synthetic oil, it is possible to list ester oil, ether oil, synthetic hydrocarbon oil, and the like. These oils can be used by mixing them arbitrarily.

Specifically as the ether oil, alkyl diphenyl ether oil, alkyl triphenyl ether oil, alkyl tetraphenyl ether oil, and the like can be listed.

As the ester oil, diester oil, polyol ester oil, complex ester oil of these oils, aromatic ester oil, and the like can be listed.

As the synthetic hydrocarbon oil, PAO oil and the like can be listed.

In the present invention, to allow the grease composition to have performance of preventing the generation of the low-temperature abnormal noise and also to be durable at the high-temperature and high-speed operation, it is preferable to use the synthetic hydrocarbon oil which has the performance of preventing the generation of the low-temperature abnormal noise as the essential component of the grease composition, and to compound the ether oil or the ester oil excellent in the durability at the high-temperature and high-speed operation therewith.

Of these oils, it is preferable to use the PAO oil, the alkyl diphenyl ether oil, and the polyol ester oil as the synthetic hydrocarbon oil, the ether oil, and the ester oil respectively.

To prevent the lubricating properties of the grease composition from deteriorating and the lubricating life thereof from decreasing, it is preferable to set the kinematic viscosity of the base oil at 40° C. to the range of 15 mm$^2$/s to 200 mm$^2$/s. If the kinematic viscosity of the base oil is less than 15 mm$^2$/s, the base oil has a low heat resistance and is inferior in durability at high temperature. If the kinematic viscosity of the base oil is more than 200 mm$^2$/s, the torque increases and a high heat is generated. Thus seizing is liable to occur.

As the above-described PAO oil, an oligomer of α-olefin or isomerized α-olefin or mixtures of polymers can be listed. As examples of the α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosane, 1-docosane, 1-tetracosane, and the like. Normally, mixtures of these substances are used.

As the urea compound which can be used as the thickener in the present invention, diurea having two urea bonds in its molecules is preferable and is shown by the following chemical formula 3:

[Chemical formula 3]

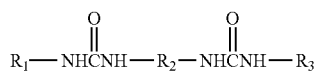

In the chemical formula 3, $R_1$ and $R_3$ represent any one of an aromatic hydrocarbon group having 6 to 12 carbon atoms, an alicyclic hydrocarbon group having 6 to 20 carbon atoms, and an aliphatic hydrocarbon group having 6 to 20 carbon atoms. $R_1$ and $R_3$ may be identical to or different from each other. $R_2$ represents an aromatic hydrocarbon group having 6 to 12 carbon atoms.

As an example of a method of producing the urea compound, a diisocyanate compound and an amine compound are allowed to react with each other by using the isocyanate group and the amino group in an equivalent weight. Besides the diurea, polyurea or the like can be used.

It is preferable that the thickener which is used in the present invention contains the urea compound as its essential component. To allow the grease composition to have performance of preventing the generation of the low-temperature abnormal noise and also to be durable at the high-temperature and high-speed operation, it is preferable to use aliphatic amine having performance of preventing the generation of the low-temperature abnormal noise and alicyclic amine and aromatic amine which are excellent in durability at the high-temperature and high-speed operation.

As preferable amine, it is possible to list octyl amine as the aliphatic amine, cyclohexyl amine as the alicyclic amine, and p-toluidine as the aromatic amine.

The grease composition of the present invention contains the above-described base oil and the thickener as its essential components and further contains the poly(metha)acrylate. The grease composition may further contain additives such as an extreme-pressure agent, an antioxidant, a rust preventive agent, a metal-inactivating agent, and the like contained in conventional grease compositions.

Extreme-Pressure Agent

By using the known extreme-pressure agent, the withstand load and extreme pressure properties can be improved. For example, it is possible to use the following compounds as necessary: As organometallic compounds, organic molybdenum compounds such as molybdenum dithiocarbamate and molybdenum dithiophosphate; organic zinc compounds such as zinc dithiocarbamate, zinc dithiophosphate, and zinc phenate; organic antimony compounds such as antimony dithiocarbamate and antimony dithiophosphate; organic selenium compounds such as selenium dithiocarbamate; organic bismuth compounds such as bismuth naphthenate and bismuth dithiocarbamate; organic iron compounds such as ferric dithiocarbamate and ferric octynoate; organic copper compounds such as copper dithiocarbamate and copper naphthenate; organic lead compounds such as lead naphthene and lead dithiocarbamate; organic tin compounds such as tin maleate and dibutyltin sulfide; organic sulfonate, phenate, phosphonate of alkali metal and alkali earth metal; and organometallic compounds containing gold, silver, titanium, cadmium, and the like. As sulfur-based compounds, it is possible to use a sulfide compound such as dibenzyl disulfide or a polysulfide compound, sulfurized fats and oils, compounds of ashless carbamic acid, thiourea compounds, or thiocarbonates. As a phosphoric acid-based extreme-pressure agent, it is possible to use phosphate such as trioctyl phosphate and tricresyl phosphate; and phosphate compounds such as acidic phosphate, phosphite, and acidic phosphite. In addition, it is possible to use a halogen-based extreme-pressure agent such as chlorinated paraffin or solid lubricants such as molybdenum disulfide, tungsten disulfide, graphite, polytetrafluoroethylene, antimony sulfide, and boron compounds such as boron nitride.

Of these extreme-pressure agents, compounds of dithiocarbamic acid and those of dithiophosphoric acid can be preferably used. When the grease composition contains the poly(metha)acrylate as additive, it is particularly preferable to utilize the zinc dithiophosphate.

Antioxidant

As the antioxidant, an age resistor, an ozone deterioration preventive agent, and an antioxidant to be added to rubber, plastics, lubricant, and the like can be selectively used. For example, the following compounds can be used: amine compounds such as phenyl-1-naphtylamine, phenyl-2-naphtylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, N,N'-diisopropyl-p-phenylenediamine, and N,N'-di-sec-butyl-p-phenylenediamine.

Phenol antioxidants can be also used. As the phenol antioxidants, 2,6-di-t-dibutylphenol, n-octadecyl-3-(3',5'-di-tert-butyl-4-hydroxyphenyl)propionate, tetrakis-(methylene-3-(3',5'-di-t-butyl-4-hydroxyphenyl)propionate)methane, 2,2'-methylenebis-(4-methyl-6-t-butylphenol), and 4,4'-butylidenebis-(3-methyl-6-t-butylphenol) are listed.

Rust Preventive Agent

As the rust preventive agent, the following compounds can be used: That is, ammonium salts of organic sulfonic acid; barium, zinc, calcium, alkali metal such as magnesium; organic sulfonates of alkali earth metal; organic carboxylate; phenate, phosphonate, derivatives of alkyl and alkenyl succinic acid such as alkyl and alkenyl succinates, partial ester of polyvalent alcohol such as sorbitan monooleate; hydroxy fatty acids such as oleyl sarcosine; mercapto fatty acids such as 1-mercapto stearate or metal salts thereof; higher fatty acids such as stearic acid; higher alcohols such as isostearyl alcohol; esters of higher alcohols and higher fatty acids; thiazoles such as 2,5-dimercapto-1,3,4-thiazolazole, 2-mercaptothiaziazole; imidazole compounds such as 2-(decyldithio)-benzimidazole, benzimidazole; disulfide compounds such as 2,5-bis(dodecyldithio)-benzimidazole; phosphate such as toris nonylphenyl phosphite; and thiocarboxylate compound such as dilauryl thiopropionate. It is also possible to use corrosion inhibitors such as nitride, nitrate, chromate, phosphate, molybdate, and tungstate all having a function of passivating the surface of metal.

Metal-Inactivating Agent:

As the metal-inactivating agent, triazole compounds such as benzotriazole and tolyltriazole can be used.

Oiliness Agent

As the oiliness agents, the following compounds can be used: fatty acids such as oleic acid, stearic acid; fatty alcohols such as oleyl alcohol; fatty esters such as polyoxyethylene stearate, polyglyceryl oleate; phosphoric acid; and phosphates such as tricresyl phosphate, laurate, polyoxyethylene oleyl ether phosphate, and the like.

In the grease composition of the present invention having heat-resistant properties and performance of preventing the abnormal noise from being generated when it is cold, it is preferable that the mixing ratio of the additive including the poly(metha) acrylate is 0.1 to 20 parts by weight for the total, namely, 100 parts by weight of the base oil and the thickener. If the mixing ratio of the additive is less than 0.1 parts by weight, there is a small effect of adding the additive to the base oil and the thickener. On the other hand, if the mixing ratio of the additive is more than 20 parts by weight, grease softens and is liable to leak.

It is preferable that the mixing ratio of the base oil is 50 to 95 parts by weight for the total, namely, 100 parts by weight of the base oil and the thickener. If the mixing ratio of the base oil is below 50 parts by weight, the grease is hard and has low lubricating properties at a low temperature. If the mixing ratio of the base oil exceeds 95 parts by weight, the grease is soft and liable to leak.

It is preferable that the mixing ratio of the thickener is 5 to 50 parts by weight for the total, namely, 100 parts by weight of the base oil and the thickener. If the mixing ratio of the thickener is below 5 parts by weight, the grease becomes liquid having a low viscosity and is liable to leak. Thus it is difficult to seal the grease composition in the bearing. On the other hand, if the mixing ratio of the thickener exceeds 50 parts by weight, the grease composition solidifies and thus has a consistency of 100 or less. Therefore the grease composition cannot be practically used as grease to be enclosed in the bearing.

An example of the grease-enclosed rolling bearing of the present invention is shown in FIG. 1. FIG. 1 is a sectional view of a deep groove ball bearing.

A grease-enclosed rolling bearing 1 includes an inner ring 2 having an inner ring rolling surface 2a on its peripheral surface, an outer ring 3 concentric with the inner ring 2 and having an outer ring rolling surface 3a on its inner peripheral surface, and a plurality of rolling elements 4 disposed between the inner ring rolling surface 2a and the outer ring rolling surface 3a. A cage 5 retaining the plurality of rolling elements 4 and a sealing member 6 fixed to the outer ring 3 and the like are provided at openings 8a and 8b of the inner ring 2 and the outer ring 3 respectively. The openings 8a and 8b are disposed at axial end of the inner ring 2 and the outer ring 3 respectively. A grease 7 is essentially applied to the periphery of each rolling element 4.

FIGS. 2 and 3 show an example of automotive electric auxiliary machines. FIG. 2 is a sectional view showing the construction of a fan-coupling apparatus. In the fan-coupling apparatus, inside a casing 10 supporting a cooling fan 9, there are an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13.

A bimetal 16 is mounted on a front surface of the casing 10. A piston 17 of the spring 15 is provided on the bimetal 16. When the temperature of air that has passed through a radiator is equal to or below a set temperature, for example, 60° C., the bimetal 16 becomes flat. As a result, the piston 17 presses the spring 15, and the spring 15 closes the port 14. When the temperature of the air exceeds the set temperature, as shown in FIG. 3, the bimetal 16 is curved outward. As a result, the piston 17 does not press the spring 15. Thus the spring 15 deforms elastically and opens the port 14.

Supposing that the temperature of the air that has passed through the radiator is lower than the set temperature of the bimetal 16 when the fan-coupling apparatus having the above-described construction is operated, the viscous fluid inside the oil chamber 11 does not flow into the stirring chamber 12 because the port 14 is closed with the spring 15. At this time, the viscous fluid inside the stirring chamber 12 is fed through a circulation hole 19 formed on the partitioning plate 13 into the oil chamber 11 owing to a rotation of the drive disk 18.

Therefore the amount of the viscous fluid inside the stirring chamber 12 becomes slight. Because a shear resistance of the viscous fluid generated owing to the rotation of the drive disk 18 becomes small, a transmission torque to the casing 10 decreases. Thus the fan 9 rotates at a low speed.

When the temperature of the air that has passed through the radiator exceeds the set temperature of the bimetal 16, as shown in FIG. 3, the bimetal 16 is curved outward, and the piston 17 does not press the spring 15. At this time, because the spring 15 deforms elastically in a direction in which the spring 15 moves away from the partitioning plate 13, the spring 15 opens the port 14. Thereby the viscous fluid inside the oil chamber 11 flows into the stirring chamber 12 through the port 14.

Therefore the shear resistance of the viscous fluid generated owing to the rotation of the drive disk 18 becomes large. Thus a rotational torque to the casing 10 increases, and the fan 9 supported by the rolling bearing rotates at a high speed.

Since in the fan-coupling apparatus, the rotational speed of the fan 9 changes in dependence on the change in temperature, warming-up is accelerated, and over-cooling of cooling water is prevented. Thus the engine can be effectively cooled. When the temperature of the engine is low, the fan 9 is placed in a state in which the fan 9 is cut off from a drive shaft 20. On the other hand, when the temperature of the engine is high, the fan 9 is placed in a state in which the fan 9 is connected to a drive shaft 20. Therefore the rolling bearing 1 is used in a wide temperature range from a low temperature to a high temperature and in a wide rotational-speed range.

FIG. 4 shows an example of an alternator which is an automotive electric auxiliary machine, of the present invention. FIG. 4 is a sectional view showing the construction of the alternator. Through a pair of ball bearing 1, a rotating shaft 23 on which a rotor 22 is mounted is rotatably supported on a pair of frames 21*a* and 21*b* which are stationary members and form a housing. A rotor coil 24 is mounted on the rotor 22. A stator coil 26 of three rolls is mounted at a phase of 120 degrees on a stator 25 disposed on the periphery of the rotor 22.

A rotating shaft 23 of the rotor 22 is driven by a rotational torque transmitted to a pulley 27 mounted on the front end thereof through a belt (not shown in FIG. 4). The pulley 27 is mounted on the rotating shaft 23 in a cantilevered state. Vibrations are generated when the rotating shaft 23 rotates at a high speed. Thus a ball bearing 1 supporting the pulley 27 is subjected to a high load.

FIG. 5 shows an example of an idler pulley which is used as a belt tensioner of a driving belt of an automotive electric auxiliary machine of the present invention. FIG. 5 is a sectional view showing the construction of the idler pulley.

The pulley has a body 28 made of a pressed steel plate and deep groove ball bearing 1, arranged in one row, fitted on the inner periphery of the pulley body 28. The pulley body 28 is an annular body constructed of an inner cylindrical part 28*a*, a flange part 28*b* extending from one end of the inner cylindrical part 28*a* to the periphery of the body 28, an outer cylindrical part 28*c* extending axially from the flange part 28*b*, and a collar 28*d* extending from the other end of the inner cylindrical part 28*a* to the inner periphery of the body 28. An outer ring 3 of the ball bearing 1 is fitted on the inner periphery of the inner cylindrical part 28*a*. A peripheral surface 28*e* that contacts a belt driven by an engine is provided on the periphery of the outer cylindrical part 28*c*. The peripheral surface 28*e* is brought into contact with the belt so that the pulley serves as an idler.

The ball bearing 1 has the outer ring 3 fitted on the inner periphery of the inner cylindrical part 28*a* of the body 28, an inner ring 2 fitted on an unshown fixed shaft, a plurality of rolling elements 4 disposed between a transfer surface 2*a* of the inner ring 2 and a transfer surface 3*a* of the outer ring 3, a cage 5 for retaining the rolling elements 4 circumferentially at regular intervals, and a pair of sealing members 6 sealing the grease. The inner ring 2 and the outer ring 3 are formed integrally.

An electromagnetic clutch and a compressor of an automotive electric auxiliary machine of the present invention are described below with reference to FIG. 6. FIG. 6 is a sectional view showing the construction of the electromagnetic clutch and the compressor of a scroll type.

The operation of an electromagnetic clutch 29 is shown below. A rolling bearing 1 incorporated in a pulley 31 is mounted on a nose portion 37 of a compressor 30. An outer ring of the rolling bearing is rotated by being driven by a belt. When a coil 34*a* of a stator 34 is energized, a clutch plate 36 fixed to a rotating shaft 35 of the compressor is attracted to the pulley 31 by a magnetic flux generated by coil current and coupled thereto. Thereby the rotating shaft 35 of the compressor is driven.

The electromagnetic clutch has functions of transmitting a torque between an engine and the compressor and cutting it off by the above-described operation, adjusting the number of rotations of the compressor determined in dependence of the diameter of the pulley, lessening an impact when the compressor operates, and absorbing a fluctuation of the torque when the compressor rotates in a steady state.

The compressor 30 of the scroll type has a pair of spiral parts composed of a movable scroll 32 and a fixed scroll 33. While a space generated between both scrolls is moving from an outer side of the compressor 30 to the center thereof, the volume thereof is decreased to compress a refrigerant.

The number of rotations of the rotating shaft 35 of the compressor is 10000 rpm or more and up to about 12000 rpm. The peripheral temperature may rise to about 180° C. Thus it is necessary for the rolling bearing 1 of the electromagnetic clutch 29 shown in FIG. 6 and other rolling bearings (not shown) inside the compressor to have a sufficient durability.

EXAMPLES

Examples 1 Through 6

The base oil, the thickener, and the additive were mixed with each other at ratios shown in table 1 to obtain a grease composition of each of examples 1 through 6. The mixing amount of the additive is shown in part by weight for the total, namely, 100 parts by weight of the base oil and the thickener. The consistency and the low-temperature abnormal noise were measured. Further a life test at a high temperature was conducted on the grease compositions. The results are shown in table 1. The test methods and the test conditions are shown below.

Comparative Examples 1 Through 6

The base oil, the thickener, and the additive were mixed with each other at ratios shown in table 1 to obtain a grease composition of each of comparative examples 1 through 6. The mixing amount of the additive is shown in part by weight for the total, namely, 100 parts by weight of the base oil and the thickener. Similarly to the examples, the consistency and the low-temperature abnormal noise were measured. Further a life test at a high temperature was conducted on the grease compositions. The results are shown in table 1. The test methods and the test conditions are shown below.

Measurement of Consistency

The consistency was measured by carrying out the method specified in JIS K2220. The consistency at 25° C. was measured by the worked penetration after 60 strokes, whereas the consistency at −20° C. was measured by the unworked penetration.

Measurement of Low-Temperature Abnormal Noise

An amount of 0.9 g of the grease composition obtained in of each of the examples and the comparative examples was enclosed respectively in rolling bearings (6203) having a radial gap of 0 to 8 μm when they were incorporated in a test pulley. Each rolling bearing was placed in a cryostat having a temperature of −60° C. for a certain period of time and taken out therefrom. Thereafter each rolling bearing was mounted on a bearing rotating apparatus whose temperature was set to a room temperature. When the temperature of the rolling bearing became −20° C., the rolling bearing was rotated at 2700 rpm under a radial load of 127N to be aurally confirmed the presence or absence of the low-temperature abnormal noise.

The performance of preventing the generation of the low-temperature abnormal noise was evaluated based on the ratio of the number of the rolling bearings which generated the low-temperature abnormal noise to the total (n=10) of the number of the rolling bearings. Grease compositions having ratios of 20% or less were evaluated as excellent in the performance of preventing the generation of the low-temperature abnormal noise, and indicated as "Good." On the other hand, grease compositions having ratios more than 20% were evaluated as inferior in the performance of preventing the generation of the low-temperature abnormal noise, and indicated as "Bad." Table 1 shows the results.

Life Test of Grease at High Temperature

An amount of 1.8 g of the grease composition obtained in each of the examples and the comparative examples was enclosed in rolling bearings (6204) respectively. Each rolling bearing was rotated at a rotational speed of 10000 rpm when the temperature of each rolling bearing was 150° C. under an axial load of 670N and a radial load of 67N. The time required for seizing to occur was measured.

To evaluate the durability at a high temperature, grease compositions which required 500 hours or more before seizing occurred were evaluated as excellent in the heat resistance, and indicated as "Good." On the other hand, grease compositions which required less than 500 hours before the seizing occurred were evaluated as inferior in the heat resistance, and indicated as "Bad." Table 1 shows the results.

TABLE 1

| | Example | | | | | | Comparative example | | | | | |
|---|---|---|---|---|---|---|---|---|---|---|---|---|
| | 1 | 2 | 3 | 4 | 5 | 6 | 1 | 2 | 3 | 4 | 5 | 6 |
| Component (parts by weight) | | | | | | | | | | | | |
| Base oil | | | | | | | | | | | | |
| Synthetic hydrocarbon oil (PAO oil)[1] | 50 | 50 | 64 | 64 | 32 | 50 | 50 | 64 | 32 | 50 | 50 | 87 |
| Ester oil[2] | — | — | — | — | 50 | — | — | — | 50 | — | — | — |
| Alkyl diphenyl ether oil[3] | 32 | 32 | 16 | 16 | — | 32 | 32 | 16 | — | 32 | 32 | — |
| Thickener | | | | | | | | | | | | |
| Amine: octyl amine | 4.8 | 4.8 | 5.3 | 5.3 | — | 4.8 | 4.8 | 5.3 | — | 4.8 | 4.8 | 6.6 |
| Amine: cyclohexyl amine | — | — | — | — | 8 | — | — | — | 8 | — | — | — |
| Amine: p-toluidine | 4 | 4 | 4.4 | 4.4 | — | 4 | 4 | 4.4 | — | 4 | 4 | — |
| Isocyanate: 4,4'-diphenylmethane diisocyanate | 9.2 | 9.2 | 10.3 | 10.3 | 10 | 9.2 | 9.2 | 10.3 | 10 | 9.2 | 9.2 | 6.4 |
| Base oil + thickener | 100 | 100 | 100 | 100 | 100 | 100 | 100 | 100 | 100 | 100 | 100 | 100 |
| Additive | | | | | | | | | | | | |
| Poly (metha) acrylate[4] | 5 | 10 | 3 | 5 | 5 | 5 | — | — | — | — | — | — |
| ZnTP (zinc dithiophosphate)[5] | — | — | — | — | — | 1 | — | — | — | — | — | — |
| Polyoxyethylene lauryl ether[6] | — | — | — | — | — | — | — | — | — | 1 | — | — |
| Polytetrafluoroethylene[7] | — | — | — | — | — | — | — | — | — | — | 1 | — |
| Properties | | | | | | | | | | | | |
| Worked penetration (25° C.) | 273 | 288 | 290 | 295 | 274 | 283 | 267 | 278 | 261 | 255 | 275 | 320 |
| Unworked penetration (−20° C.) | 235 | 245 | 240 | 245 | 215 | 240 | 170 | 180 | 175 | 155 | 165 | 240 |
| Probability (%) of generation of low-temperature abnormal noise | 20 | 20 | 20 | 10 | 10 | 10 | 80 | 70 | 60 | 90 | 100 | 0 |
| Life at high temperature (hour) | 650 | 570 | 550 | 500 | 500 | 750 | 450 | 400 | 350 | 420 | 650 | 250 |
| Evaluation | | | | | | | | | | | | |
| Performance of preventing generation of low-temperature abnormal noise | Good | Good | Good | Good | Good | Good | Bad | Bad | Bad | Bad | Bad | Good |
| Durability at high temperature | Good | Good | Good | Good | Good | Good | Bad | Bad | Bad | Bad | Good | Bad |

Manufacture companies, Name of products (kinematic viscosity (40° C.))
[1] Nippon Steel Chemical Co., Ltd., Shin-fluid 801 (47 mm$^2$/s)
[2] Ciba Specialty Chemicals, Leolube LTM (53 mm$^2$/s)
[3] Matsumura Oil Research Corp., MCRESCO HILUBE LB100 (97 mm$^2$/s)
[4] Sanyo Chemical Industries, Ltd., ACLUBE 504
[5] ADEKA Corporation, Kikulube Z112
[6] Kao Corporation, Emalgen 104P
[7] Sumitomo 3M Limited, TF9207

As shown in table 1, grease compositions having the worked penetration of 300 or less at 25° C. and the unworked penetration of 200 or more at −20° C. had a lower probability of generation of the low-temperature abnormal noise and further had a longer life at a high temperature. This is because the use of the base oil prevented the viscosity of the grease composition from rising under cold condition, and thus prevented the oil film of the raceway surface of the rolling bearing from becoming nonuniform. Thereby the effect of preventing the generation of the low-temperature abnormal noise is assumed to be increased. Therefore the grease composition can be preferably used for the rolling bearing to be used under cold condition and above all for the rolling bearing for use in the automotive electric auxiliary machine.

INDUSTRIAL APPLICABILITY

The grease composition of the present invention displays preferable lubricating properties in a wide temperature range from a low temperature to a high temperature, and is capable of preventing the generation of the abnormal noise immediately after the bearing starts to operate at a low temperature. Therefore the bearing in which the grease composition of the present invention is enclosed can be preferably used as an automotive bearing for a car and the like under cold condition.

EXPLANATION OF REFERENCE SYMBOLS AND NUMERALS

Figure 1:
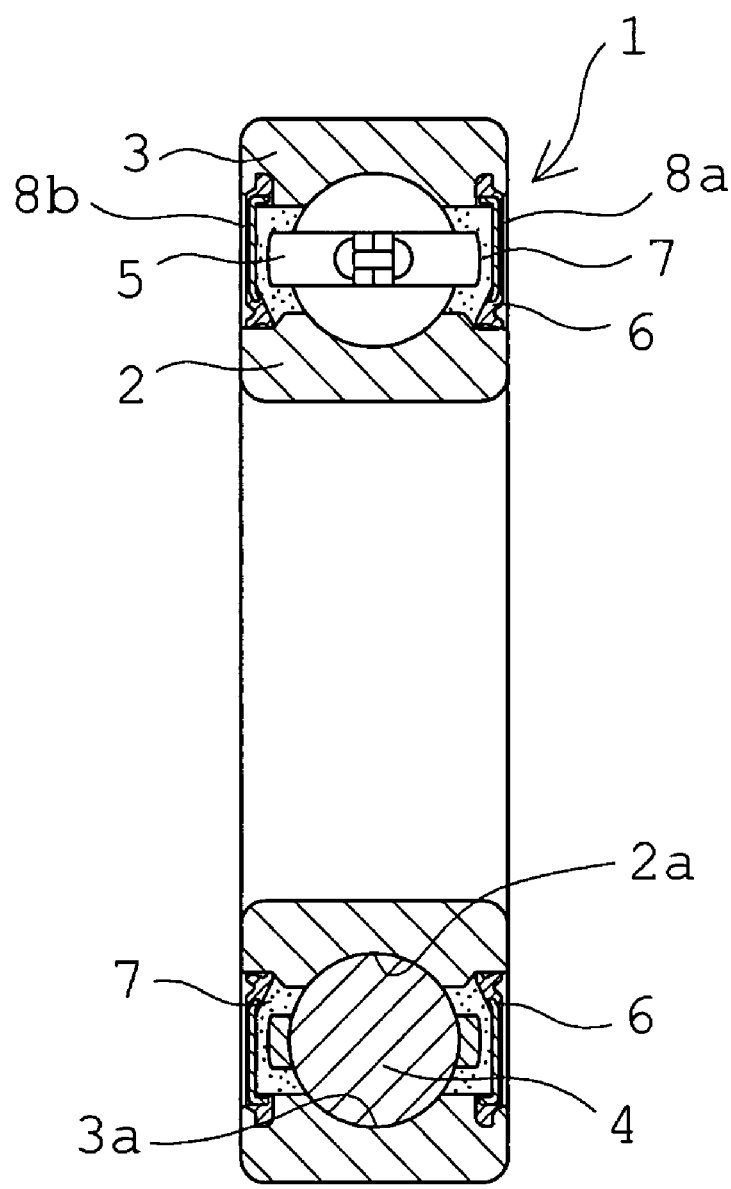
FIG. 1 is a sectional view of a rolling bearing.
Figure 2:
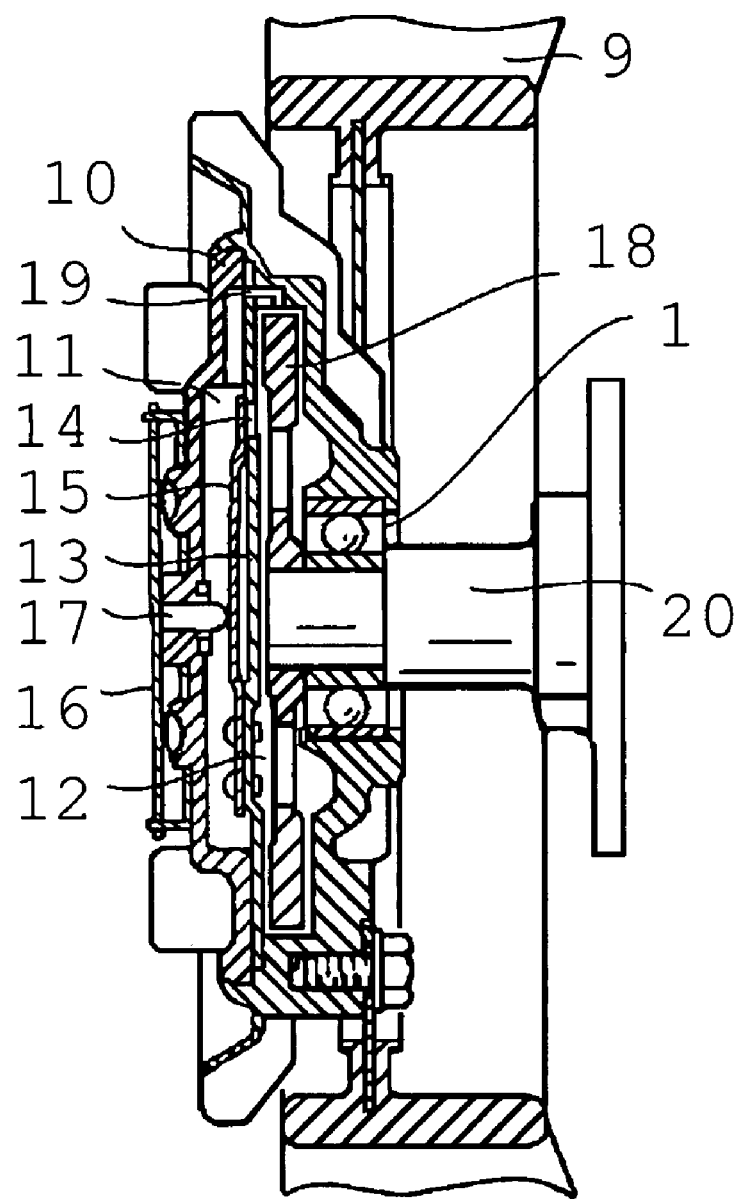
FIG. 2 is a sectional view of a fan coupling apparatus.
Figure 3:
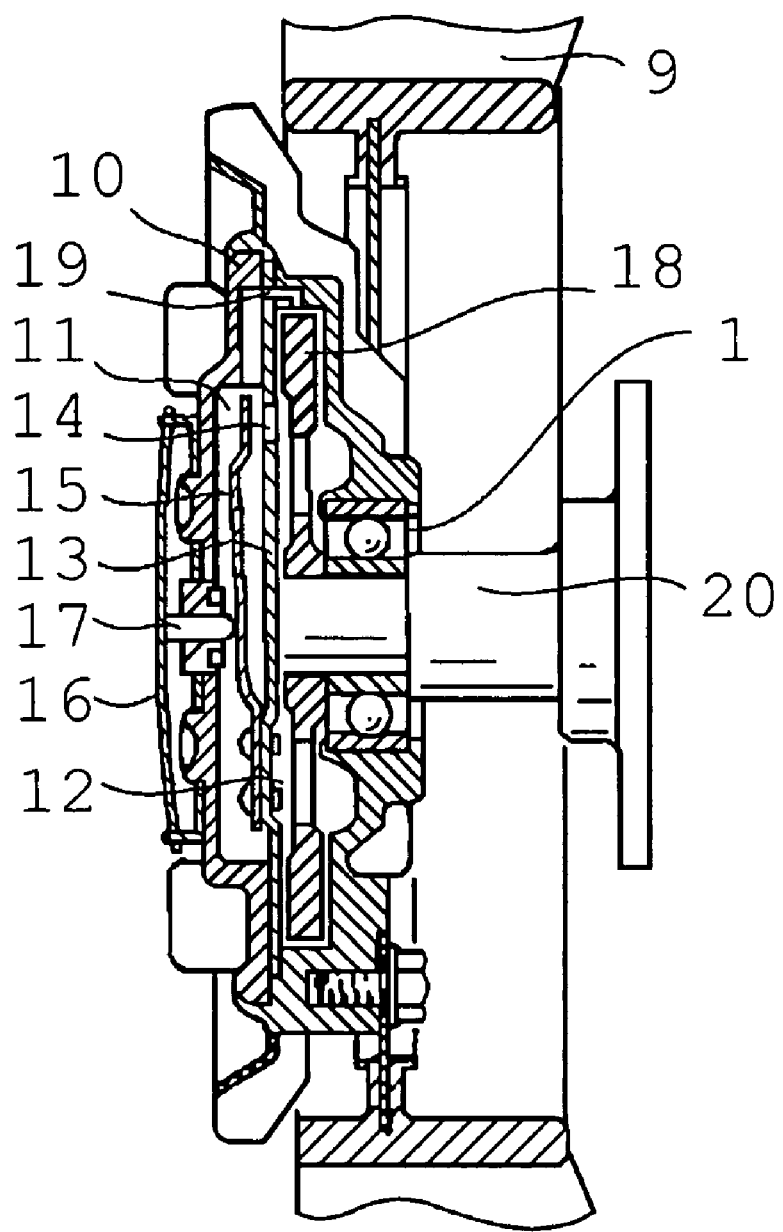
FIG. 3 is a sectional view of the fan coupling apparatus.
Figure 4:
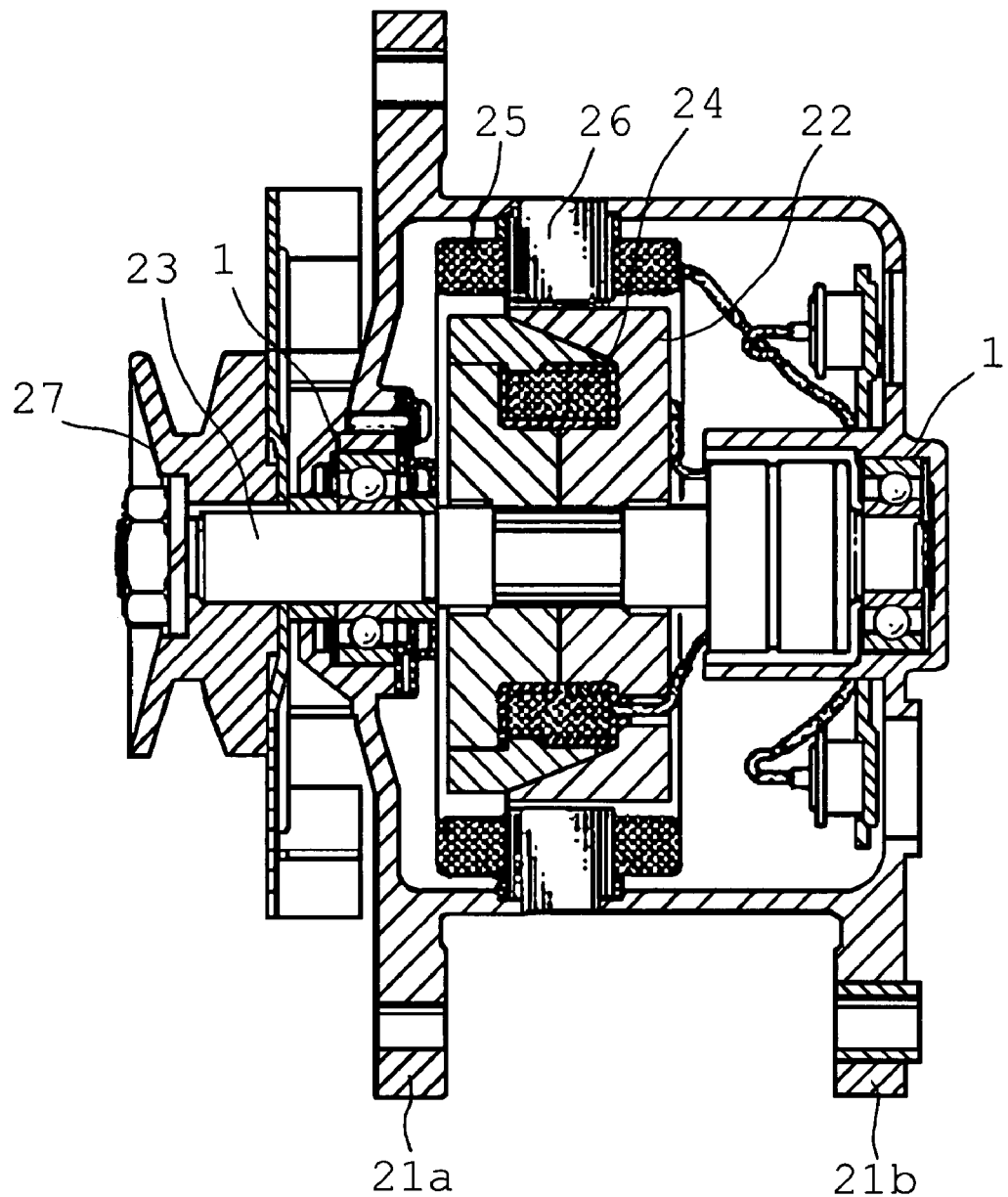
FIG. 4 is a sectional view of an alternator.
Figure 5:
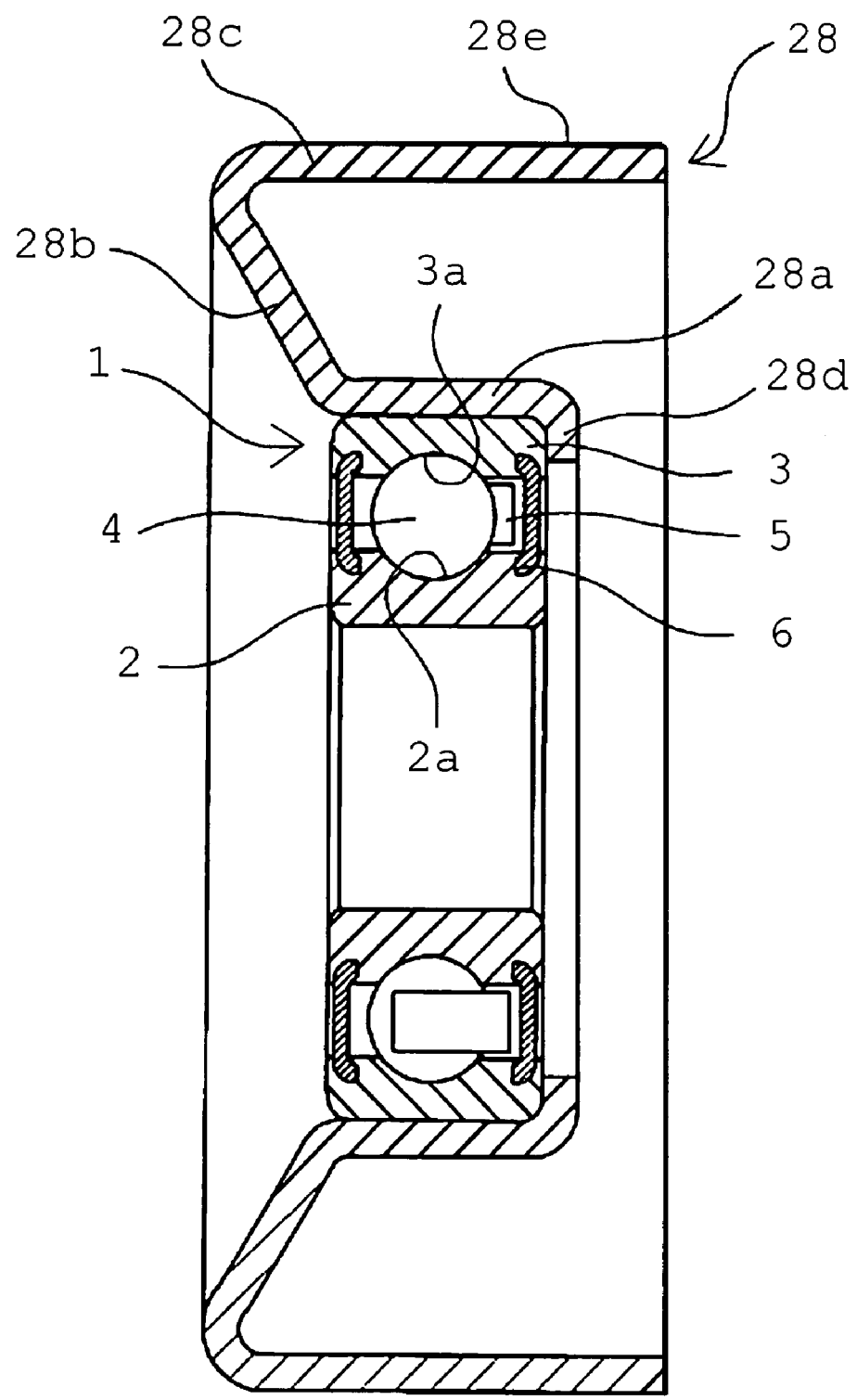
FIG. 5 is a sectional view of an idler pulley.
Figure 6:
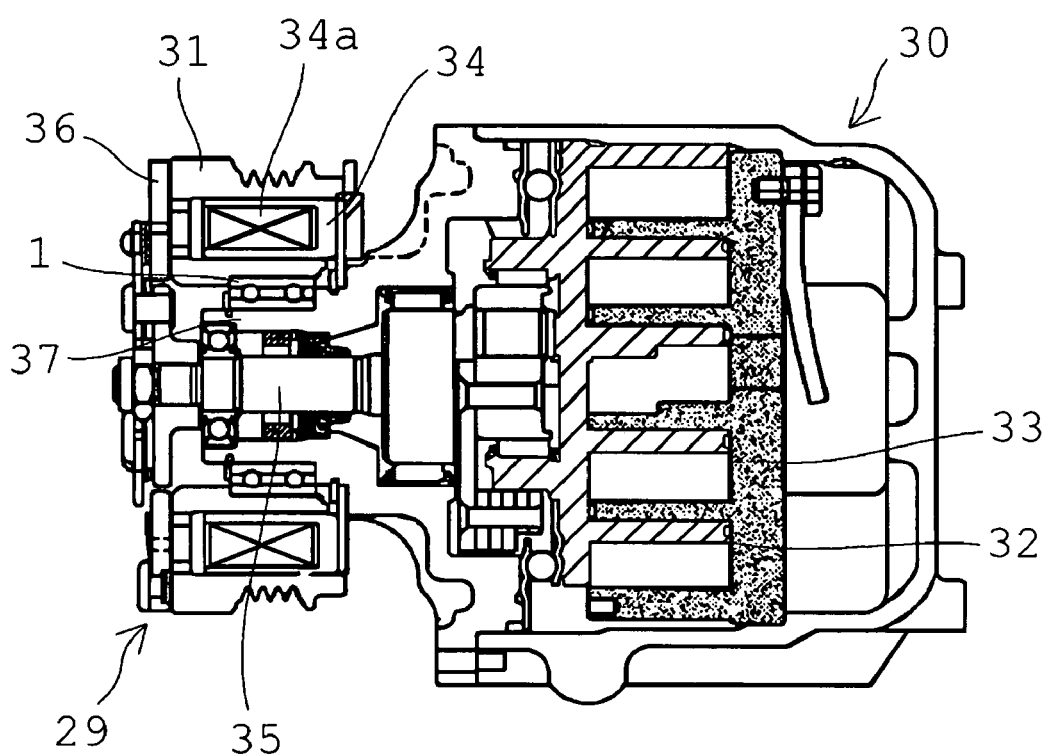
FIG. 6 is a sectional view of an electromagnetic clutch and a compressor.

1: deep groove ball bearing
2: inner ring
3: outer ring
4: rolling element
5: cage
6: sealing member
7: grease composition
8: opening
9: cooling fan
10: casing
11: oil chamber
12: stirring chamber
13: partitioning plate
14: port
15: spring
16: bimetal
17: piston
18: drive disk
19: circulation hole
20: drive shaft
21: frame
22: rotor
23: rotating shaft of rotor
24: rotor coil
25: stator
26: stator coil
27: pulley
28: pulley body
29: electromagnetic clutch
30: compressor
31: pulley
32: movable scroll
33: fixed scroll
34: stator
35: rotating shaft of compressor
36: clutch plate
37: nose portion

The invention claimed is:

1. A grease composition for a rolling bearing having heat-resistant properties and performance of preventing an abnormal noise from being generated when it is cold, comprising a base oil, a thickener, and an additive,
wherein a worked penetration of said grease composition at 25° C. is 300 or less, and an unworked penetration at −20° C. is 200 or more,
wherein said additive comprises poly(metha)acrylate having a weight average molecular weight of 20,000 to 1.5 million,
wherein a mixing amount of said poly(metha)acrylate for a total mount of said base oil and said thickener is 3 to 10 wt %,
wherein said additive further contains zinc dithiophosphate,
wherein said base oil consists of ether oil and poly-α-olefin oil, the ratio of parts by weight of said poly-α-olefin oil to parts by weight of said ether oil for 100 parts by weight of the total amount of said base oil and said thickener is in the range of 50:32 to 64:16,
wherein said base oil has a kinematic viscosity of 15 mm$^2$/s to 200 mm$^2$/s at 40° C.
wherein said thickener comprises a diurea compound prepared by reacting an amine compound and 4,4'-diphenylmethane diisocyanate, said amine compound being octyl amine and p-toluidine.

2. A grease-enclosed rolling bearing comprising an inner ring, an outer ring, rolling elements interposed between said inner ring and said outer ring, and a grease composition enclosed on a periphery of said rolling elements, wherein said grease composition is a grease composition having heat-resistant properties and performance of preventing an abnormal noise from being generated when it is cold according to claim 1.

3. The grease-enclosed rolling bearing according to claim 2, which is used for an automotive electric auxiliary machine in which a rotating shaft to be rotatably driven by an output of an engine is rotatably supported on a stationary member, and is heat-resistant and has performance of preventing the generation of the low-temperature abnormal noise.

4. The grease-enclosed rolling bearing according to claim 3, wherein said automotive electric auxiliary machine is a fan coupling apparatus, an alternator, an idler pulley, a tension pulley, an electromagnetic clutch or a compressor.

5. The grease composition according to claim 1, wherein said poly(metha)acrylate is at least one selected from the group consisting of polymers and copolymers of methyl (metha)acrylate, ethyl(metha)acrylate, propyl(metha)acrylate, butyl(metha)acrylate, pentyl(metha)acrylate, hexyl (metha)acrylate, heptyl(metha)acrylate, octyl(metha) acrylate), nonyl(metha)acrylate, decyl(metha)acrylate, octadecyl(metha)acrylate, octyl(metha)acrylate), nonyl (metha)acrylate, decyl(metha)acrylate, tetradecyl(metha) acrylate, hexadecyl(metha)acrylate), octadecyl(metha)acrylate, tetracosyl(metha)acrylate), octacosyl(metha)acrylate, and triacontyl(metha)acrylate, octadecyl(metha)acrylate.

* * * * *